United States Patent
Vigild et al.

(10) Patent No.: US 8,783,029 B2
(45) Date of Patent: Jul. 22, 2014

(54) SUPERCHARGED INTERNAL COMBUSTION ENGINE AND METHOD FOR OPERATING AN INTERNAL COMBUSTION ENGINE OF SAID TYPE

(75) Inventors: Christian Winge Vigild, Aldenhoven (DE); Andreas Kuske, Geulle (DK); Daniel Roettger, Eynatten (BE); Juergen Karl Stief, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 242 days.

(21) Appl. No.: 13/346,558

(22) Filed: Jan. 9, 2012

(65) Prior Publication Data

US 2012/0174578 A1 Jul. 12, 2012

(30) Foreign Application Priority Data

Jan. 12, 2011 (DE) .......................... 10 2011 002 553

(51) Int. Cl.
*F02B 33/44* (2006.01)

(52) U.S. Cl.
USPC ...................... 60/605.2; 123/568.11; 123/563

(58) Field of Classification Search
USPC .............................. 60/605.2; 123/568.11, 563
See application file for complete search history.

(56) References Cited

U.S. PATENT DOCUMENTS

| | | | | |
|---|---|---|---|---|
| 4,708,120 | A * | 11/1987 | Mann | 123/563 |
| 5,456,239 | A * | 10/1995 | Henderson et al. | 123/563 |
| 6,293,102 | B1 * | 9/2001 | Stay et al. | 60/605.2 |
| 7,261,098 | B2 * | 8/2007 | Vigild et al. | 60/605.2 |
| 7,620,490 | B2 * | 11/2009 | Matsunaga | 60/605.2 |
| 7,681,394 | B2 * | 3/2010 | Haugen | 60/605.2 |
| 8,015,954 | B2 * | 9/2011 | Kardos | 123/563 |
| 8,036,813 | B2 * | 10/2011 | Tonetti et al. | 60/605.2 |
| 8,240,294 | B2 * | 8/2012 | Surnilla et al. | 60/605.2 |
| 2011/0000470 | A1 * | 1/2011 | Roth | 123/568.11 |
| 2011/0283699 | A1 * | 11/2011 | Surnilla et al. | 60/605.2 |
| 2012/0174576 | A1 * | 7/2012 | Vigild et al. | 123/563 |
| 2013/0139795 | A1 * | 6/2013 | Saitoh et al. | 123/568.16 |
| 2013/0247567 | A1 * | 9/2013 | Petrovic et al. | 60/605.2 |
| 2014/0026565 | A1 * | 1/2014 | Peters et al. | 60/612 |

FOREIGN PATENT DOCUMENTS

EP 2284376 A1 2/2011

* cited by examiner

*Primary Examiner* — Thomas Denion
*Assistant Examiner* — Ngoc T Nguyen
(74) *Attorney, Agent, or Firm* — Julia Voutyras; Alleman Hall McCoy Russell & Tuttle LLP

(57) ABSTRACT

A supercharged internal combustion engine is provided. The engine comprises a cylinder, an intake line in an intake system, for supplying charge air to the cylinder, an exhaust line for discharging exhaust gases, an exhaust-gas turbocharger including a turbine arranged in the exhaust line and a compressor arranged in the intake line, an exhaust-gas recirculation arrangement including a recirculation line which branches off from the exhaust line downstream of the turbine and opens into the intake line upstream of the compressor, and a sensor for detecting the concentration $C_{i,intake}$ of a component i of the charge air in the intake system provided downstream of the opening of the recirculation line into the intake line. In this way, the exhaust-gas recirculation may be regulated based on feedback from the sensor to control emissions.

12 Claims, 5 Drawing Sheets

SUPERCHARGED INTERNAL COMBUSTION ENGINE AND METHOD FOR OPERATING AN INTERNAL COMBUSTION ENGINE OF SAID TYPE

RELATED APPLICATIONS

The present application claims priority to German Patent Application No. 102011002553.7, filed on Jan. 12, 2011, the entire contents of which are hereby incorporated by reference for all purposes.

FIELD

The disclosure relates to a supercharged internal combustion engine.

BACKGROUND AND SUMMARY

Internal combustion engines are ever more commonly being equipped with supercharging for increasing power, in which the charge air required for the combustion process in the engine is compressed, as a result of which a greater mass of charge air can be supplied to each cylinder per working cycle. In this way, the fuel mass and therefore the mean effective pressure can be increased.

In general, for supercharging, use is made of an exhaust-gas turbocharger in which a compressor and a turbine are arranged on the same shaft, with the hot exhaust-gas flow being supplied to the turbine, expanding in said turbine with a release of energy, and thereby setting the shaft in rotation. The energy supplied by the exhaust-gas flow to the shaft is used for driving the compressor which is likewise arranged on the shaft. The compressor delivers and compresses the charge air supplied to it, as a result of which supercharging of the cylinders is obtained. It is advantageous for a charge-air cooler to be provided in the intake line downstream of the compressor, by which charge-air cooler the compressed charge air is cooled before it enters the at least one cylinder. The cooler lowers the temperature and thereby increases the density of the charge air, such that the cooler also contributes to improved charging of the cylinders, that is to say to a greater air mass. In effect, compression by cooling takes place.

Supercharging is suitable for increasing the power of an internal combustion engine while maintaining an unchanged swept volume, or for reducing the swept volume while maintaining the same power. In any case, supercharging leads to an increase in volumetric power output and an improved power-to-weight ratio. For the same vehicle boundary conditions, it is thus possible to shift the load collective toward higher loads, where the specific fuel consumption is lower. This is also referred to as downsizing.

Supercharging consequently assists in the constant efforts in the development of internal combustion engines to minimize fuel consumption, that is to say to improve the efficiency of the internal combustion engine. With targeted configuration of the supercharging, it is also possible to obtain advantages with regard to exhaust-gas emissions. With suitable supercharging for example of a diesel engine, the nitrogen oxide emissions can be reduced without any losses in efficiency. The hydrocarbon emissions can be favorably influenced at the same time. The emissions of carbon dioxide, which correlate directly with fuel consumption, likewise decrease with falling fuel consumption.

To adhere to future limit values for pollutant emissions, however, further measures are necessary. Here, the focus of the development work is on inter alia the reduction of nitrogen oxide emissions, which are of high relevance in particular in diesel engines. Since the formation of nitrogen oxides requires not only an excess of air but rather also high temperatures, one concept for lowering the nitrogen oxide emissions consists in developing combustion processes with lower combustion temperatures.

Here, inter alia exhaust-gas recirculation (EGR), that is to say the recirculation of combustion gases from the outlet side to the inlet side, is expedient in achieving this aim, wherein it is possible for the nitrogen oxide emissions to be considerably reduced with increasing exhaust-gas recirculation rate. Here, the exhaust-gas recirculation rate $x_{EGR}$ is determined as $x_{EGR}=m_{EGR}/(m_{EGR}+m_{fresh\ air})$, where $m_{EGR}$ denotes the mass of recirculated exhaust gas and $m_{fresh\ air}$ denotes the supplied fresh air.

To obtain a considerable reduction in nitrogen oxide emissions, high exhaust-gas recirculation rates are required which may be of the order of magnitude of $x_{EGR} \approx 60\%$ to $70\%$.

When operating an internal combustion engine with exhaust-gas turbocharging and with the simultaneous use of exhaust-gas recirculation, such as is the case in the internal combustion engine according to the disclosure, a conflict may arise if the recirculated exhaust gas is extracted from the exhaust line upstream of the turbine by means of high-pressure EGR and is no longer available for driving the turbine.

In the event of an increase in the exhaust-gas recirculation rate, the exhaust-gas flow introduced into the turbine then simultaneously decreases. The reduced exhaust-gas mass flow through the turbine results in a lower turbine pressure ratio, as a result of which the charge pressure ratio likewise falls, which is equivalent to a smaller compressor mass flow. Aside from the decreasing charge pressure, additional problems may arise in the operation of the compressor with regard to the surge limit of the compressor. Disadvantages may also arise with regard to the pollutant emissions, for example with regard to the formation of soot in diesel engines during acceleration.

For this reason, concepts are required which—in particular in the part-load range—ensure adequately high charge pressures with simultaneously high exhaust-gas recirculation rates. One proposed solution is so-called low-pressure EGR.

In contrast to the abovementioned high-pressure EGR arrangement, in which exhaust gas is extracted from the exhaust line upstream of the turbine and introduced into the intake line downstream of the compressor, in the case of a low-pressure EGR arrangement exhaust gas which has already flowed through the turbine is recirculated to the inlet side. For this purpose, the low-pressure EGR arrangement comprises a recirculation line which branches off from the exhaust line downstream of the turbine and opens into the intake line upstream of the compressor.

An internal combustion engine which is supercharged by means of exhaust-gas turbocharging and which is equipped with a low-pressure EGR arrangement is also the subject matter of the present disclosure.

The exhaust gas which is recirculated via the low-pressure EGR arrangement to the inlet side is mixed with fresh air upstream of the compressor. The mixture of fresh air and recirculated exhaust gas produced in this way forms the charge air which is supplied to the compressor and compressed, wherein the compressed charge air is supplied to the at least one cylinder downstream of the compressor.

Here, it is not disadvantageous that exhaust gas is conducted through the compressor during the course of the low-pressure EGR, because in general exhaust gas is used which has been subjected to exhaust-gas aftertreatment, in particular in the particle filter, downstream of the turbine. There is therefore no risk of depositions in the compressor which change the geometry of the compressor, in particular the flow cross sections, and thereby impair the efficiency of the compressor.

In contrast, problems may arise downstream of the compressor if the compressed charge air is cooled again before it enters the cylinders. During the course of the cooling, liquids previously contained in the charge air still in gaseous form may be condensed out if the dew point temperature of a component of the gaseous charge-air flow, in particular water, is undershot. Owing to the conventionally low arrangement of the charge-air cooler, condensate may collect in the cooler, which condensate is then introduced in uncontrolled fashion, in particular in the form of shocks, into the intake system and may lead to a severe disruption to the operation of the internal combustion engine or to irreversible damage of components downstream of the cooler. This phenomenon takes on greater significance with increasing recirculation rate, because with the increase in the recirculated exhaust-gas quantity, the proportions of the individual exhaust-gas components in the charge air inevitably increase, in particular the proportion of the water contained in the exhaust gas. Therefore, the exhaust-gas quantity recirculated via the low-pressure EGR arrangement is limited in order to reduce the water quantity condensed out or to prevent condensing-out. Here, the high recirculation rates required for a considerable reduction of the nitrogen oxide emissions are achieved through the additional use of a high-pressure EGR arrangement, including the disadvantages associated therewith.

To improve the emissions characteristics of an internal combustion engine, it is necessary for the measures and systems applied or used for reducing the pollutant emissions to be controlled and/or regulated as effectively as possible, that is to say provided with high-quality control and/or regulation.

Since exhaust-gas recirculation serves primarily for the reduction of the nitrogen oxide emissions ($NO_x$), use is often made of a $NO_x$ sensor, which is arranged in the exhaust-gas discharge system, for regulating the EGR valve, that is to say for adjusting the recirculation rate. If the untreated $NO_x$ emissions of the internal combustion engine are higher than a predefined setpoint value, the EGR valve is adjusted in the direction of the open position in order to increase the EGR rate in order to reduce the nitrogen oxide concentration $C_{NOx,exhaust}$ in the exhaust gas.

The concept for regulating the EGR rate has numerous disadvantages. Firstly, the sensor used for detecting the nitrogen oxide concentration is a very expensive sensor, which entails costs for example three times higher than those for an oxygen sensor. Secondly, and an aspect regarded as being particularly critical with regard to the quality of the EGR regulation, the sensor is thermally highly loaded, and at high risk of contamination, owing to its arrangement in the exhaust-gas discharge system, that is to say in the hot exhaust gas which has not undergone aftertreatment. The high exhaust-gas temperatures may considerably shorten the service life of the sensor, lead to damage or destruction of the sensor and thereby lead to failure of the EGR regulation. Contamination of the sensor with soot particles and oil contained in the exhaust gas may have the result that the nitrogen oxide concentration detected by the sensor is afflicted with a significant measurement error, that is to say the sensor outputs too low a nitrogen oxide concentration.

The inventors herein have recognized the above the issues and provide a system to at least partly address them. In one embodiment, a supercharged internal combustion engine is provided. The engine comprises a cylinder, an intake line in an intake system, for supplying charge air to the cylinder, an exhaust line for discharging exhaust gases, an exhaust-gas turbocharger including a turbine arranged in the exhaust line and a compressor arranged in the intake line, an exhaust-gas recirculation arrangement including a recirculation line which branches off from the exhaust line downstream of the turbine and opens into the intake line upstream of the compressor, and a sensor for detecting the concentration $C_{i,intake}$ of a component i of the charge air in the intake system provided downstream of the opening of the recirculation line into the intake line.

In the internal combustion engine according to the disclosure, a sensor is provided in the intake system and not in the exhaust-gas discharge system. This has numerous advantages. The charge air—even after the compression in the compressor—is at a considerably lower temperature than the hot exhaust gas, such that that the thermal loading of the sensor is significantly lower and there is no risk of damage to or destruction of the sensor as a result of overheating. In fact, the sensor is advantageously equipped with an electric heater by which it can be heated to a minimum operating temperature.

Furthermore, the sensor, on account of its arrangement in the intake system and the recirculation of aftertreated exhaust gas via the low-pressure EGR arrangement, is not at risk of being contaminated by soot particles contained in the exhaust gas or by oil contained in the exhaust gas.

The effects described above considerably improve the quality of the EGR regulation in relation to the previous systems. There is no risk of failure of the EGR regulation as a result of thermal overloading. There is likewise no risk of a concentration $C_{i,intake}$ being detected erroneously as a result of a contaminated sensor.

According to the disclosure, in order that the sensor is impinged on by charge air which contains exhaust gas already recirculated via the low-pressure EGR arrangement in addition to the fresh air, and not exclusively by fresh air, the sensor is or should be arranged downstream of the opening of the recirculation line into the intake line.

The sensor serves to detect by measurement the concentration $C_{i,intake}$ of a component i of the charge air in the intake system, which concentration can be taken into consideration in an equation for determining the proportion $F_{intake}$ of the charge air fraction resulting from the combustion, and/or for determining the recirculation rate $x_{EGR}$. Using the sensor, it is therefore possible for the recirculation rate $x_{EGR}$ of the low-pressure EGR to be adjusted, that is to say for a shut-off valve, which is preferably arranged in the recirculation line and which serves as a low-pressure EGR valve for adjusting the recirculation rate, to be actuated.

With certain assumptions, it is possible in this way to realize closed-loop control of the low-pressure EGR, for example if the exhaust-gas recirculation takes place exclusively via the low-pressure EGR arrangement. That is to say also if an additional high-pressure EGR arrangement is provided but is deactivated. Furthermore, in the abovementioned scenarios, the concentration $C_{i,intake}$ detected by means of a sensor or the proportion $F_{intake}$ may be used to determine the nitrogen oxide concentration $C_{NOx,exhaust}$ in the exhaust gas, that is to say the untreated emissions of nitrogen oxides $NO_x$. Here, it is possible to dispense with an expensive $NO_x$ sensor, which is arranged in the exhaust-gas discharge system, for determining the nitrogen oxide concentration $C_{NOx,exhaust}$ in the exhaust gas and/or for regulating the EGR valve, that is to say for regulating the exhaust-gas quantity recirculated via the low-pressure EGR arrangement.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
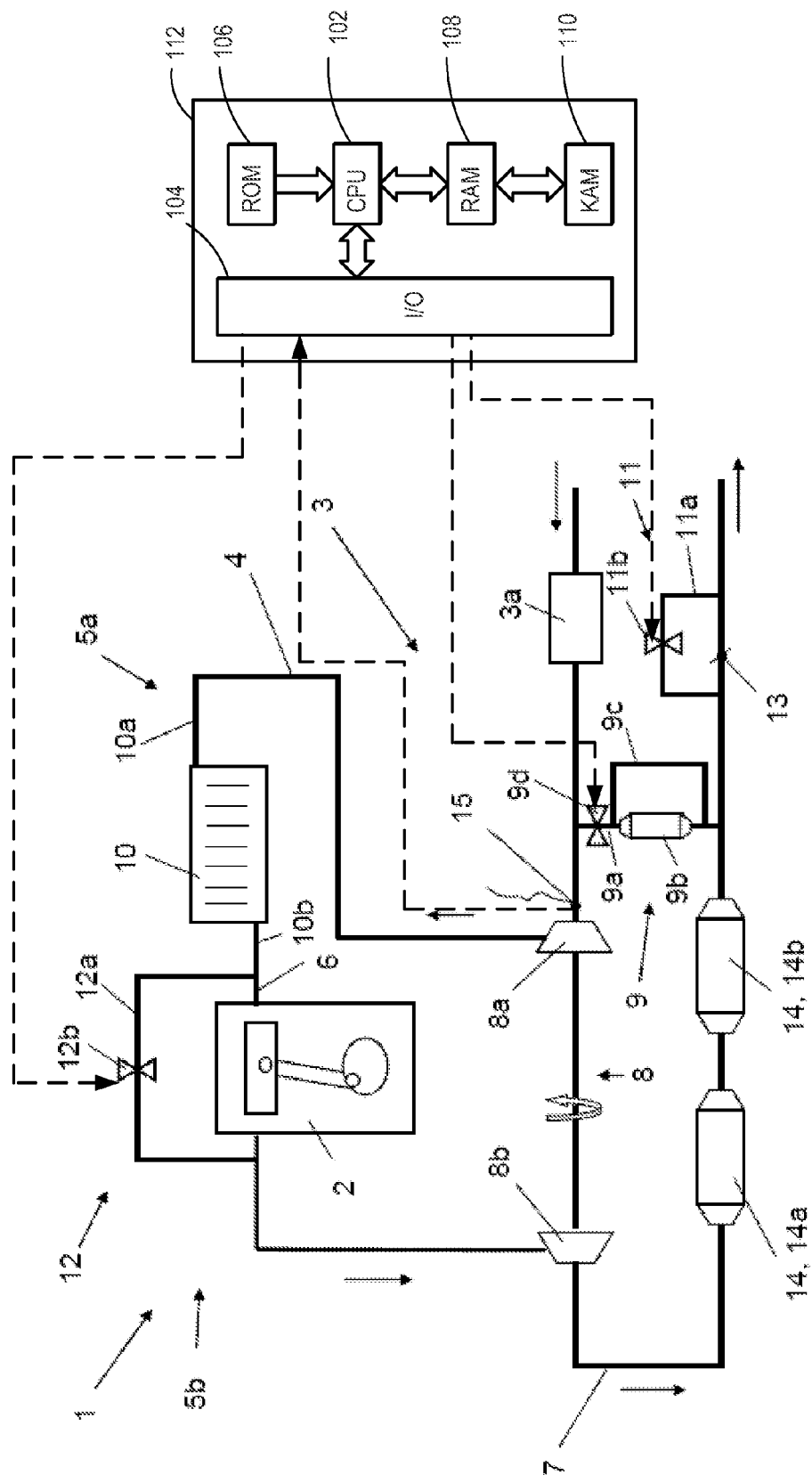
FIG. 1 schematically shows a first embodiment of the internal combustion engine.

FIG. 1 schematically shows a first embodiment of the internal combustion engine 1 which has at least one cylinder 2 and is controlled by electronic engine controller 112. Within the context of the present disclosure, the expression "internal combustion engine" encompasses diesel engines, spark-ignition engines and also hybrid internal combustion engines. Each cylinder 2 has at least one inlet opening and is supplied with charge air via an intake system 3 provided on the inlet side 5a. The intake system 3 comprises not only an intake line 4 but also an inlet manifold 6 which leads to the inlet openings of the cylinders 2. To discharge the exhaust gases, each cylinder 2 has at least one outlet opening which is adjoined by an exhaust line 7.

The internal combustion engine 1 illustrated in FIG. 1 is supercharged by an exhaust-gas turbocharger 8 and is furthermore equipped with an exhaust-gas recirculation arrangement. The charger 8 has a turbine 8b, which is arranged in the exhaust line 7, and a compressor 8a, which is arranged in the intake line 4. To form a low-pressure EGR (LP-EGR) arrangement 9, a recirculation line 9a is provided which branches off from the exhaust line 7 downstream of the turbine 8b and opens into the intake line 4 upstream of the compressor 8a, and in which a cooler 9b is arranged which lowers the temperature in the hot exhaust-gas flow before the exhaust gas is mixed, upstream of the compressor 8a, with fresh air which is sucked in via the intake line 4 through an air filter 3a. Also arranged in the recirculation line 9a is a shut-off element 9d which functions as a low-pressure EGR valve 9d and which serves for adjusting the exhaust-gas quantity recirculated via the low-pressure EGR arrangement 9. The low-pressure EGR arrangement 9 has a bypass line 9c for bypassing the cooler 9b.

Upstream of the branching of the recirculation line 9a, the exhaust line 7 has arranged in it two exhaust-gas aftertreatment systems 14, specifically an oxidation catalytic converter 14a and a particle filter 14b, which ensure that only aftertreated exhaust gas passes into the intake system 3 via the low-pressure EGR arrangement 9.

Since the recirculation of exhaust gas from the exhaust line 7 into the intake line 4 requires a pressure difference, that is to say a pressure gradient, a system 11 for adjusting the exhaust-gas counterpressure is provided. A throttle 13 arranged in the exhaust line 7 is equipped with a bypass line 11a. By suitable adjustment of the throttle 13 and of a shut-off element 11b provided in the bypass line 11a, the exhaust-gas counterpressure upstream of the throttle 13 can be varied and controlled.

The exhaust gas introduced into the intake line 4 via the low-pressure EGR arrangement 9 is mixed with fresh air. The charge air thus formed is supplied to the compressor and compressed. Downstream of the compressor 8a, the compressed charge air is then cooled in a charge-air cooler 10 which is provided in the intake line 4.

The charge-air cooler 10 is situated above the at least one inlet opening of the at least one cylinder 2, and in the present case is arranged at the geodetically highest point in the intake system 3. The geodetic height in the intake system 3 decreases in the flow direction proceeding from the inlet 10a into the charge-air cooler 10 toward the cylinder 2, such that there is a continuous downward slope in the flow direction. This is also achieved in that the inlet 10a into the charge-air cooler 10 is situated geodetically higher than the outlet 10b out of the charge-air cooler 10.

To be able to generate very high recirculation rates, an additional exhaust-gas recirculation arrangement 12 is provided. To form said high-pressure EGR (HP-EGR) arrangement 12, a line 12a is provided which branches off from the exhaust line 7 upstream of the turbine 8b and opens into the intake system 3 downstream of the charge-air cooler 10. To adjust the exhaust-gas quantity recirculated via the high-pressure EGR arrangement 12, a shut-off element 12b which serves as a high-pressure EGR valve 12b is arranged in the line 12a.

A sensor 15 for detecting the concentration $C_{i,intake}$ of a component, i, of the charge air in the intake system 3 is provided downstream of the opening of the recirculation line 9a into the intake line 4.

If the exhaust-gas recirculation 9, 12 takes place exclusively via the low-pressure EGR arrangement 9, that is to say the high-pressure EGR arrangement 12 is deactivated, the low-pressure EGR arrangement 9 can be operated by a closed-loop control.

The concentration $C_{i,intake}$ detected by the sensor 15 may be used for determining the proportion $F_{intake}$ of the charge air fraction resulting from the combustion, and/or for determining the recirculation rate $x_{EGR}$. Using the sensor 15, it is therefore possible for the recirculation rate $x_{EGR}$ of the low-pressure EGR arrangement 9 to be adjusted, that is to say for the shut-off element 9d arranged in the recirculation line 9a to be actuated in order to adjust the recirculation rate. The nitrogen oxide concentration $C_{NOx,exhaust}$ in the exhaust gas may likewise be determined based on the sensor reading.

The sensor 15 may be an $O_2$ sensor for detecting the concentration of the oxygen ($O_2$) in the charge air, such as a UEGO or HEGO sensor. An $O_2$ sensor is relatively inexpensive. Furthermore, the $O_2$ sensor has the advantage that the $O_2$ concentration of the fresh air can be assumed to be known and constant within the context of an equation.

The sensor may however basically also be a sensor by means of which the concentration of the unburned hydrocarbons, of the carbon monoxide or of the carbon dioxide in the charge air can be detected.

Controller 112 is shown in FIG. 1 as a conventional microcomputer including: microprocessor unit 102, input/output ports 104, read-only memory 106, random access memory 108, keep alive memory 110, and a conventional data bus. Controller 112 may include instructions that are executable to carry out one or more control routines. Controller 112 is shown receiving various signals from sensors coupled to engine 1, such as input from sensor 15, as well as other sensors not shown in FIG. 1. Example sensors include engine coolant temperature (ECT) from a temperature sensor, a position sensor coupled to an accelerator pedal for sensing accelerator position, a measurement of engine manifold pressure (MAP) from a pressure sensor coupled to the intake manifold, an engine position sensor from a Hall effect sensor sensing crankshaft position, a measurement of air mass entering the engine from sensor (e.g., a hot wire air flow meter), and a measurement of throttle position. Barometric pressure may also be sensed for processing by controller 112. In a preferred aspect of the present description, an engine position sensor may produce a predetermined number of equally spaced pulses every revolution of the crankshaft from which engine speed (RPM) can be determined. Controller 112 may also output signals to various actuators of the engine, such as valves 9d, 11b, and 12b, based on feedback from signals received from the various engine sensors.

As already mentioned, examples of the internal combustion engine are advantageous in which a shut-off element is arranged in the recirculation line, which shut-off element functions as a low-pressure EGR valve and serves for adjusting the recirculation rate, that is to say the exhaust-gas quantity recirculated via the low-pressure EGR arrangement.

Here, examples are advantageous in which the low-pressure EGR valve is arranged at the location at which the recirculation line opens into the intake line. The valve is then preferably designed as a combination valve by means of which the recirculated exhaust-gas quantity and the sucked-in fresh air quantity are dimensioned simultaneously and in a coordinated manner.

According to the disclosure, the internal combustion engine is equipped with at least one exhaust-gas turbocharger for the purpose of supercharging. In particular, however, examples of the internal combustion engine are also advantageous in which at least two exhaust-gas turbochargers are provided. The reasons are as follows.

If a single exhaust-gas turbocharger is used, a noticeable torque drop is observed if a certain rotational speed is not met. Said effect is undesirable because the driver expects a correspondingly high torque even in the lower rotational speed range. The so-called turbo lag at low rotational speeds is therefore also one of the most severe disadvantages of exhaust-gas turbocharging.

Said torque drop is understandable if one takes into consideration that the charge pressure ratio is dependent on the turbine pressure ratio. In the case of a diesel engine, for example, if the engine rotational speed is reduced, this leads to a smaller exhaust-gas mass flow and therefore to a lower turbine pressure ratio. This has the result that, toward lower rotational speeds, the charge pressure ratio likewise decreases, which equates to a torque drop.

Here, the drop in the charge pressure may basically be counteracted by reducing the size of the turbine cross section, which however necessitates an exhaust-gas blow-off at higher rotational speeds, with disadvantages for the supercharging behavior in said rotational speed range.

It is therefore also often attempted to improve the torque characteristic of a supercharged internal combustion engine through the use of a plurality of exhaust-gas turbochargers, for example by a plurality of exhaust-gas turbochargers connected in series.

By connecting two exhaust-gas turbochargers in series, of which one exhaust-gas turbocharger serves as a high-pressure stage and one exhaust-gas turbocharger serves as a low-pressure stage, the compressor characteristic map can advantageously be expanded, specifically both in the direction of smaller compressor flows and also in the direction of larger compressor flows.

In particular, with the exhaust-gas turbocharger which serves as a high-pressure stage, it is possible for the surge limit to be shifted in the direction of smaller compressor flows, as a result of which high charge pressure ratios can be obtained even with small compressor flows, which considerably improves the torque characteristic in the lower part-load range. This is achieved by designing the high-pressure turbine for small exhaust-gas mass flows and by providing a bypass line by which, with increasing exhaust-gas mass flow, an increasing amount of exhaust gas is conducted past the high-pressure turbine. For this purpose, the bypass line branches off from the exhaust line upstream of the high-pressure turbine and opens into the exhaust line again downstream of the turbine, wherein a shut-off element is arranged in the bypass line in order to control the exhaust-gas flow conducted past the high-pressure turbine.

The torque characteristic of a supercharged internal combustion engine may furthermore be improved by a plurality of turbochargers connected in parallel and having correspondingly small turbine cross sections, which turbochargers are activated in succession.

If the cylinders of an internal combustion engine are divided into two cylinder groups which have in each case a separate exhaust line, each of the two exhaust lines may be assigned one exhaust-gas turbocharger. Here, the turbine of the first exhaust-gas turbocharger is arranged in the exhaust line of the first cylinder group, whereas the turbine of the second exhaust-gas turbocharger is arranged in the exhaust line of the second cylinder group. The compressors of the exhaust-gas turbochargers may be arranged in parallel or in series. The exhaust-gas turbochargers may be dimensioned to be smaller, and the turbines designed for smaller exhaust-gas flows. The response behavior is improved in relation to a similar internal combustion engine having only one exhaust-gas turbocharger because the two smaller exhaust-gas turbochargers are less inert than one large exhaust-gas turbocharger, and the rotor can accelerate and decelerate more quickly.

Examples of the internal combustion engine are advantageous in which a cooler is provided in the recirculation line of the low-pressure EGR arrangement. Said cooler lowers the temperature in the hot exhaust-gas flow before the exhaust gas is mixed with fresh air upstream of the compressor, and thereby increases the density of the exhaust gases. The temperature of the cylinder fresh charge is further lowered in this way, as a result of which said cooler also contributes to improved charging.

A bypass line is preferably provided which bypasses the cooler of the low-pressure EGR arrangement and by which the exhaust-gas recirculated via the low-pressure EGR arrangement can be introduced into the intake line having bypassed said cooler. As already mentioned, examples are advantageous in which a charge-air cooler is provided in the intake line downstream of the compressor, by which charge-air cooler the compressed charge air is cooled before it enters the at least one cylinder. The charge air is, in effect, compressed by cooling, as a result of which the charge-air cooler also contributes to improved charging of the cylinders.

A problem in conjunction with the cooling of the charge air is that liquids previously contained in the charge air still in gaseous form, in particular water, may be condensed out as a result of the temperature reduction. On account of the low arrangement of the cooler according to previous systems, for example at the level of the crankcase, that is to say at the level of the cylinder block or of the oil pan, condensate may collect in the cooler, which condensate is then introduced in an uncontrolled manner into the intake system, which is also referred to as water hammer.

In internal combustion engines in which each cylinder has at least one inlet opening, examples are therefore also advantageous in which, in the installed position of the internal combustion engine, the charge-air cooler is arranged above said at least one inlet opening of the at least one cylinder.

Here, the charge-air cooler is arranged above the cylinder inlet, that is to say geodetically higher than the at least one inlet opening, as a result of which the charge-air flow need not overcome any height difference on the path to the cylinders proceeding from the cooler. A liquid which is condensed out during the course of the cooling consequently cannot collect in the cooler or in the intake system between the cooler and cylinders. Any liquid condensed out in the cooler is continuously entrained by the charge-air flow, that is to say carried away as a result of kinetics. Here, the transportation of the condensate is based on the charge air movement or on the charge pressure built up in the intake system by the compressor, and is additionally driven by gravity owing to the arrangement of the charge-air cooler above the at least one inlet opening. Any small liquid quantities supplied to the cylinders are not detrimental to fault-free operation of the internal combustion engine. The condensate participates in the combustion process and, as a result of the evaporation enthalpy, even reduces the combustion temperature, as a result of which the formation of the nitrogen oxides is advantageously influenced, that is to say reduced.

In contrast to the concepts known previously, there is no need for a limitation of the exhaust-gas quantity recirculated via the low-pressure EGR arrangement, because condensing-out basically need not be prevented, or owing to the cooling arrangement, is not detrimental. This makes it possible for significantly greater exhaust-gas quantities to be recirculated via the low-pressure EGR arrangement, that is to say for the low-pressure EGR arrangement to be utilized to a significantly greater extent for realizing high recirculation rates. This is advantageous because, in wide operating ranges of the internal combustion engine, high-pressure EGR can be dispensed with and the disadvantages associated with high-pressure EGR eliminated.

The conflict known previously, which arose from different demands on the recirculation rate, specifically a low rate with regard to the low-pressure EGR and a high rate with regard to the reduction of nitrogen oxides, is eliminated.

Examples of the internal combustion engine are advantageous in which the geodetic height in the intake system decreases continuously in the flow direction proceeding from the inlet into the charge-air cooler toward the at least one inlet opening of the at least one cylinder.

Said example ensures that the charge-air flow does not need to overcome any gradient over the entire path proceeding from the inlet into the charge-air cooler to the at least one cylinder, that is to say there is a continuous downward slope in the flow direction.

Examples of the internal combustion engine are advantageous in which the charge-air cooler is liquid-cooled.

It is fundamentally possible for the cooling arrangement to be designed, according to the principle of a heat exchanger, in the form of an air cooling arrangement or a liquid cooling arrangement. In the case of the air cooling arrangement, the charge air conducted through the charge-air cooler is cooled an air flow which results from the relative wind and/or which is generated by a blower. In contrast, the liquid cooling arrangement necessitates the formation of a cooling circuit, if appropriate using an already existing circuit, for example the engine cooling circuit of a liquid-cooled internal combustion engine. Here, the coolant is fed by a pump arranged in the cooling circuit, such that said coolant circulates and flows through the charge-air cooler. The heat dissipated from the charge air to the coolant in the cooler is conducted away, and extracted from the coolant again in another heat exchanger.

On account of the significantly higher heat capacity of a liquid in relation to air, it is possible for significantly greater heat quantities to be dissipated by liquid cooling than is possible with air cooling. For this reason, in particular in the case of supercharged internal combustion engines with exhaust-gas recirculation, it is advantageous for the charge-air cooler to be liquid-cooled, because the heat quantity to be dissipated may be relatively large.

Examples of the supercharged internal combustion engine may be advantageous in which an additional exhaust-gas recirculation arrangement is provided which comprises a line which branches off from the exhaust line upstream of the turbine and opens into the intake system downstream of the compressor.

An additional high-pressure EGR arrangement may be advantageous in order to generate the high exhaust-gas recirculation rates required for a considerable reduction of the nitrogen oxide emissions. Here, it may be taken into consideration that the recirculation of exhaust gas from the exhaust line into the intake line requires a pressure difference, that is to say a pressure gradient, between the outlet side and the inlet side. Furthermore, to obtain the required high exhaust-gas recirculation rates, a high pressure gradient is required.

In the case of internal combustion engines which are equipped with a high-pressure EGR arrangement and in which a charge-air cooler is provided in the intake line downstream of the compressor, examples are advantageous which include the line for exhaust-gas recirculation opening into the intake system downstream of the charge-air cooler. This prevents the untreated exhaust gas which is recirculated via the high-pressure EGR arrangement from contaminating the charge-air cooler.

Examples of the internal combustion engine are advantageous in which the inlet into the charge-air cooler is arranged geodetically higher than the outlet out of the charge-air cooler. Said example of the charge-air cooler ensures that no condensate collects in the cooler, simply because the outlet is at a higher geodetic height than the inlet.

Examples of the internal combustion engine are advantageous in which the charge-air cooler is arranged so as to be inclined by an angle $\alpha$ from the inlet into the charge-air cooler to the outlet out of the charge-air cooler. In said example, the charge-air cooler is set at an angle such that a gradient is formed between the inlet and outlet.

When using an exhaust-gas turbocharger, it is basically sought to arrange the turbine as close as possible to the outlet of the cylinder in order thereby to be able to optimally utilize the exhaust-gas enthalpy of the hot exhaust gases, which is determined significantly by the exhaust-gas pressure and the exhaust-gas temperature, and to ensure a fast response behavior of the turbine or of the turbocharger. Furthermore, the path of the hot exhaust gases to the different exhaust-gas aftertreatment systems should be as short as possible such that the exhaust gases are given little time to cool down and the exhaust-gas aftertreatment systems reach their operating temperature or light-off temperature as quickly as possible, in particular after a cold start of the internal combustion engine.

For the stated reasons, the turbocharger and therefore also the compressor are positioned as close as possible to the outlet of the internal combustion engine on the outlet side. Here, it is particularly advantageous for the exhaust manifold to be integrated into the cylinder head, wherein the exhaust lines of the cylinder are merged, so as to form at least one overall exhaust line, within the cylinder head.

The above-described arrangement of the charger has the effect that the charge air which is compressed in the compressor may basically be conducted from the outlet side to the inlet side to the cylinders.

In this connection, examples of the internal combustion engine are advantageous in which the charge-air cooler is arranged above the at least one cylinder between the outlet side and the inlet side of the internal combustion engine, and so as to be inclined at an angle α from the inlet side to the outlet side. Here, in the case of internal combustion engines with at least one cylinder head which accommodates a valve drive, the charge-air cooler is arranged above the valve drive between the outlet side and the inlet side.

Said example leads to a very compact design of the internal combustion engine and permits dense packaging of the drive unit as a whole. The distance between the compressor and the inlet opening at the cylinder is shortened to the greatest possible extent, which yields a multiplicity of advantages.

The short distance in the intake system downstream of the compressor ensures a fast response behavior of the turbocharger and reduces the pressure loss in the charge-air flow up to the inlet into the combustion chamber. Unnecessarily long lines are dispensed with, which further reduces the weight and the spatial requirement of the intake system. A short distance also has an advantageous effect on the noise characteristics.

Large parts of the intake system are formed, that is to say spanned, by the charge-air cooler itself, yielding a multiplicity of advantageous examples with regard to the cooler and the inlet manifold situated downstream.

With regard to the angle α, examples have proven to be advantageous in which the angle α meets the following criteria: $\alpha \geq 5°$, preferably $20° \geq \alpha \geq 5°$. Examples of the internal combustion engine are however also advantageous in which the angle α meets the following criteria: $\alpha \geq 10°$, preferably $20° \geq \alpha \geq 10°$.

The specified angles or angle ranges ensure firstly an adequately large gradient in the cooler or of the cooler, and secondly a compact design in which the cooler does not protrude excessively far.

In internal combustion engines with a high-pressure EGR arrangement, examples are advantageous in which an additional cooler is provided in the line for high-pressure EGR. Said additional cooler lowers the temperature in the hot exhaust-gas flow and thereby increases the density of the exhaust gases. The temperature of the cylinder fresh charge is further lowered in this way, as a result of which the additional cooler also contributes to improved charging of the combustion chamber with fresh mixture.

Examples of the internal combustion engine are advantageous in which the turbine of the at least one exhaust-gas turbocharger is equipped with a variable turbine geometry, which enables a more precise adaptation to the respective operating point of an internal combustion engine by means of an adjustment of the turbine geometry or of the effective turbine cross section. Here, adjustable guide blades for influencing the flow direction are arranged in the inlet region of the turbine. In contrast to the rotor blades of the rotating rotor, the guide blades do not rotate with the shaft of the turbine.

If the turbine has a fixed, invariable geometry, the guide blades are arranged in the inlet region so as to be not only stationary but rather also completely immovable, that is to say rigidly fixed. In contrast, in the case of a variable geometry, the guide blades are duly also arranged so as to be stationary but not so as to be completely immovable, rather so as to be rotatable about their axes, such that the flow approaching the rotor blades can be influenced.

Nevertheless, examples of the internal combustion engine may also be advantageous in which the turbine of the at least one exhaust-gas turbocharger has a fixed turbine geometry. In relation to a variable geometry, this considerably simplifies the operation of the internal combustion engine and/or of the charger by means of engine control. Furthermore, the simpler design of the turbine yields cost advantages with regard to the exhaust-gas turbocharger.

Figure 2:
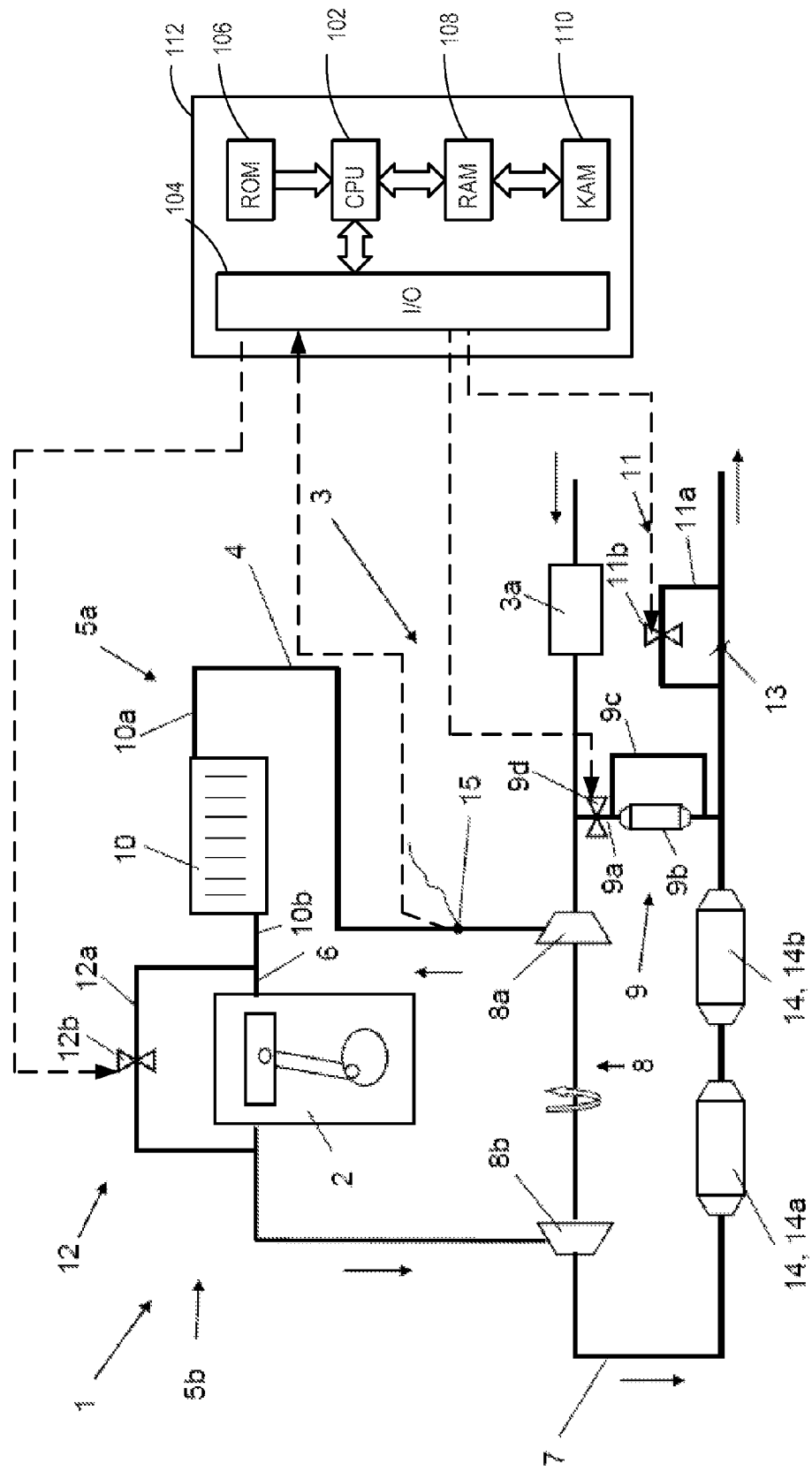
FIG. 2 schematically shows a second embodiment of the internal combustion engine.

FIG. 2 schematically shows a second embodiment of the internal combustion engine 1. It is sought to explain only the differences in relation to the embodiment illustrated in FIG. 1, for which reason reference is otherwise made to FIG. 1 and the associated description. The same reference signs are used for the same components.

In contrast to the internal combustion engine 1 illustrated in FIG. 1, it is provided in the embodiment according to FIG. 2 that the sensor 15 is arranged not upstream but rather downstream of the compressor 8a, specifically in the intake line 4 between the compressor 8a and the charge-air cooler 10. As is the case with an arrangement of the sensor 15 upstream of the compressor 8a, only the exhaust gas which has been recirculated via the low-pressure EGR arrangement 9 passes the sensor 15.

As it flows through the compressor 8a, the charge air mixture of fresh air and exhaust gas is homogenized, such that the concentration $C_{i,intake}$ detected by means of the sensor 15 carries significantly more weight, that is to say is more representative, with regard to the quality of the measurement.

The temperature of the charge air downstream of the compressor 8a is increased as a result of compression, which counteracts the condensing-out of water and helps the sensor 15 to attain its operating temperature.

As already mentioned, within the context of the present disclosure, it is basically sufficient for the sensor to be positioned in such a way that exhaust gas recirculated via the low-pressure EGR arrangement also passes the sensor. This equates to an arrangement of the sensor downstream of the opening of the recirculation line into the intake line.

With regard to the quality of the concentration $C_{i,intake}$ determined by the sensor or the quality of the EGR regulation, it is however advantageous for the sensor corresponding to the embodiment in question to be arranged downstream of the compressor, because the mixture of fresh air and exhaust gas generated by the recirculation of exhaust gas is not only compressed but rather also homogenized as it flows through the compressor. Consequently, the concentration $C_{i,intake}$ detected by the sensor within the charge-air flow downstream of the compressor will vary little, that is to say will be more representative.

The arrangement of the sensor downstream of the compressor has further advantages. The temperature of the charge air downstream of the compressor is increased as a result of compression. The condensing-out of liquids, in particular water, is counteracted in this way. This is highly relevant in that liquid impinging on the sensor can lead to damage to or destruction of the sensor, and therefore to failure of the EGR regulation. Furthermore, here, an increased charge-air temperature assists the detection of the concentration $C_{i,intake}$ by the sensor, because the sensor requires a certain minimum temperature in order to perform its function, similarly to a catalytic converter.

Embodiments of the supercharged internal combustion engine are advantageous in which the sensor is arranged between the compressor and the charge-air cooler.

The temperature of the charge air is higher upstream of the compressor than downstream, as a result of which the condensate formation, in particular the condensing-out of water, is hindered or reliably prevented. In this way, the sensor is protected against damage by condensate. The arrangement of the sensor downstream of the charge-air cooler is advantageous not only with regard to this aspect. The increased charge-air temperature assists the sensor, which may be at a minimum temperature to perform its function.

Nevertheless, embodiments of the internal combustion engine may also be advantageous in which the sensor is arranged downstream of the charge-air cooler, specifically even if, as a result of said arrangement, contamination of the sensor by soot particles contained in the exhaust gas cannot be prevented. The reasons are as follows.

Here, the sensor may be positioned downstream of the charge-air cooler, in such a way that—even if an additional high-pressure EGR arrangement is present—said sensor is impinged on exclusively by the exhaust gas recirculated via the low-pressure EGR arrangement. With regard to the concentration $C_{i,intake}$, this equates to an arrangement of the sensor upstream of the charge-air cooler.

However, if the internal combustion engine is additionally equipped with a high-pressure EGR arrangement, the sensor may also be positioned such that all of the recirculated exhaust gas passes the sensor. The line via which the high-pressure EGR arrangement recirculates exhaust gas branches off from the exhaust line upstream of the turbine and opens into the intake system downstream of the charge-air cooler. If the sensor is positioned downstream of the opening of the line into the intake system, both the exhaust gas recirculated via the low-pressure EGR arrangement and also the exhaust gas recirculated via the high-pressure EGR arrangement passes the sensor.

Since the exhaust gas recirculated via the high-pressure EGR arrangement has not been purified, in particular has not been aftertreated in a particle filter, the sensor may become contaminated. On the other hand, the arrangement of the sensor permits the detection, by measurement, of the concentration $C_{i,intake}$ of a component i of the entire charge-air flow in the intake system, and therefore the determination of the relevant total recirculation rate $x_{EGR}$. Therefore, the concentration $C_{i,intake}$ detected by means of the sensor may also be used to determine the nitrogen oxide concentration $C_{Nox,exhaust}$ in the exhaust gas, such that it is possible to dispense with a $NO_x$ sensor in the exhaust-gas discharge system.

Closed-loop control of the exhaust-gas recirculation by the sensor is possible only when only one of the two exhaust-gas recirculation arrangements is in use, that is to say when the exhaust-gas recirculation takes place exclusively via the low-pressure EGR arrangement or via the high-pressure EGR arrangement.

Figure 3:
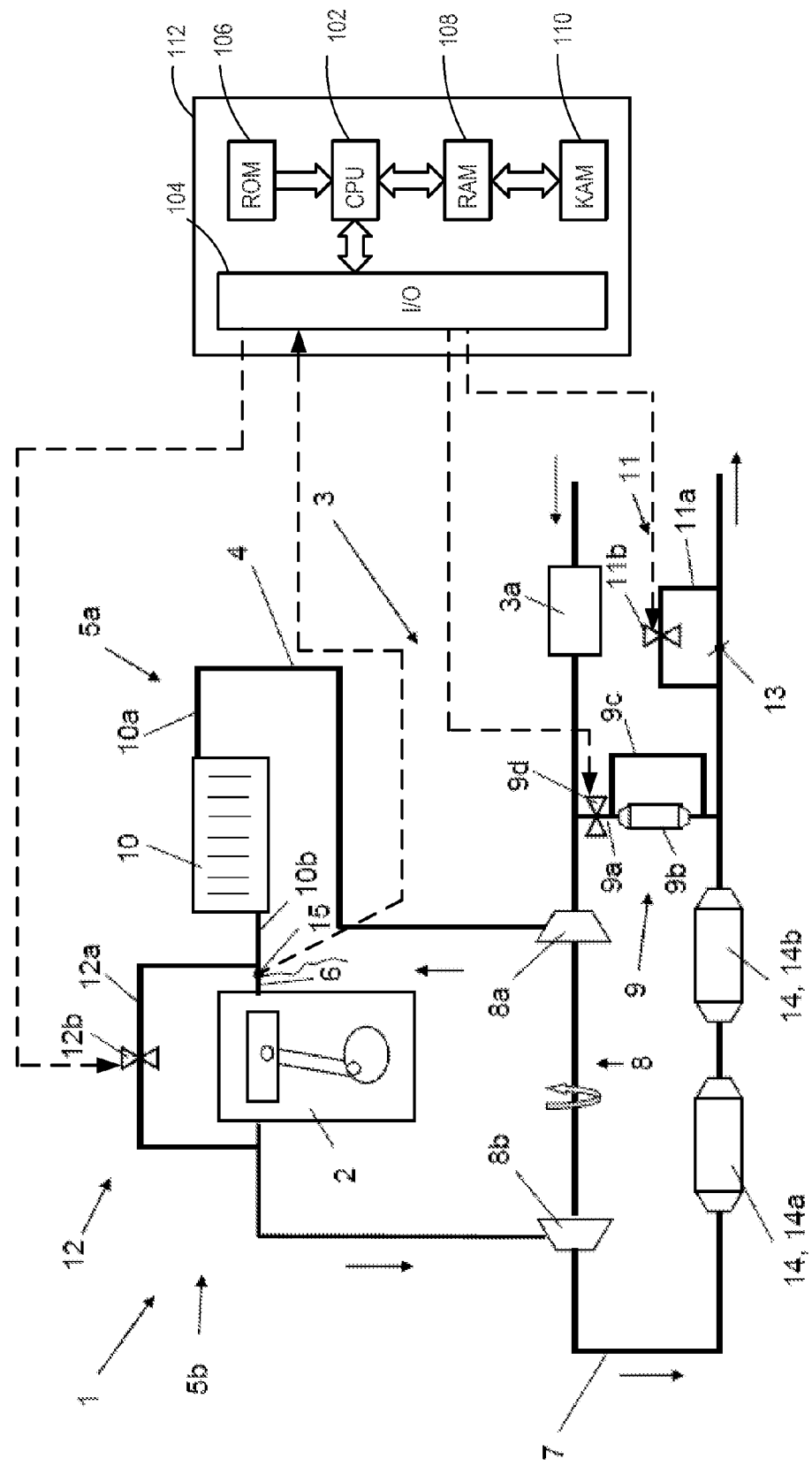
FIG. 3 schematically shows a third embodiment of the internal combustion engine.

FIG. 3 schematically shows a third embodiment of the internal combustion engine 1. It is sought to explain only the differences in relation to the embodiments illustrated in FIGS. 1 and 2, for which reason reference is otherwise made to said two figures and the associated description. The same reference signs are used for the same components.

In contrast to the internal combustion engine 1 illustrated in FIG. 2, it is provided in the embodiment according to FIG. 3 that the sensor 15 is arranged not upstream but rather downstream of the charge-air cooler 10 in the intake system 3, specifically downstream of the opening point of the line 12a of the high-pressure EGR arrangement 12. With said arrangement of the sensor 15, all of the recirculated exhaust gas passes the sensor 15.

Figure 4:
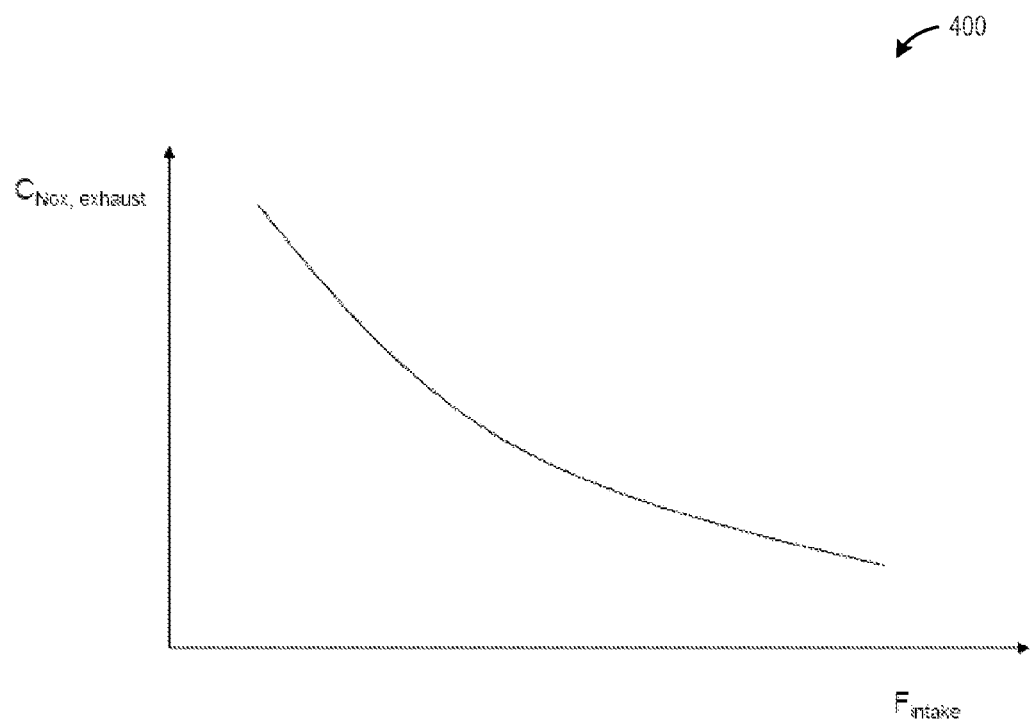
FIG. 4 shows, in a diagram, the concentration $C_{NOX}$ of nitrogen oxides in the exhaust gas versus $F_{intake}$, the proportion of the fraction of combustion products in the charge air.

FIG. 4 shows, in a diagram 400, the concentration $C_{NOX,exhaust}$ of nitrogen oxides in the exhaust gas versus $F_{intake}$, the proportion of the charge-air fraction resulting from the combustion. The proportion of the charge air that results from combustion may be determined by output from sensor 15. For example, if sensor 15 is an oxygen sensor, the reduction in the oxygen content of the air passing the sensor compared to ambient air may be attributed to the amount of EGR in the charge air. If the proportion $F_{intake}$ of combustion products in the cylinder fresh charge increases, that is to say $F_{intake}$ increases, the nitrogen oxide concentration $C_{NOX,exhaust}$ in the exhaust gas falls.

Figure 5:
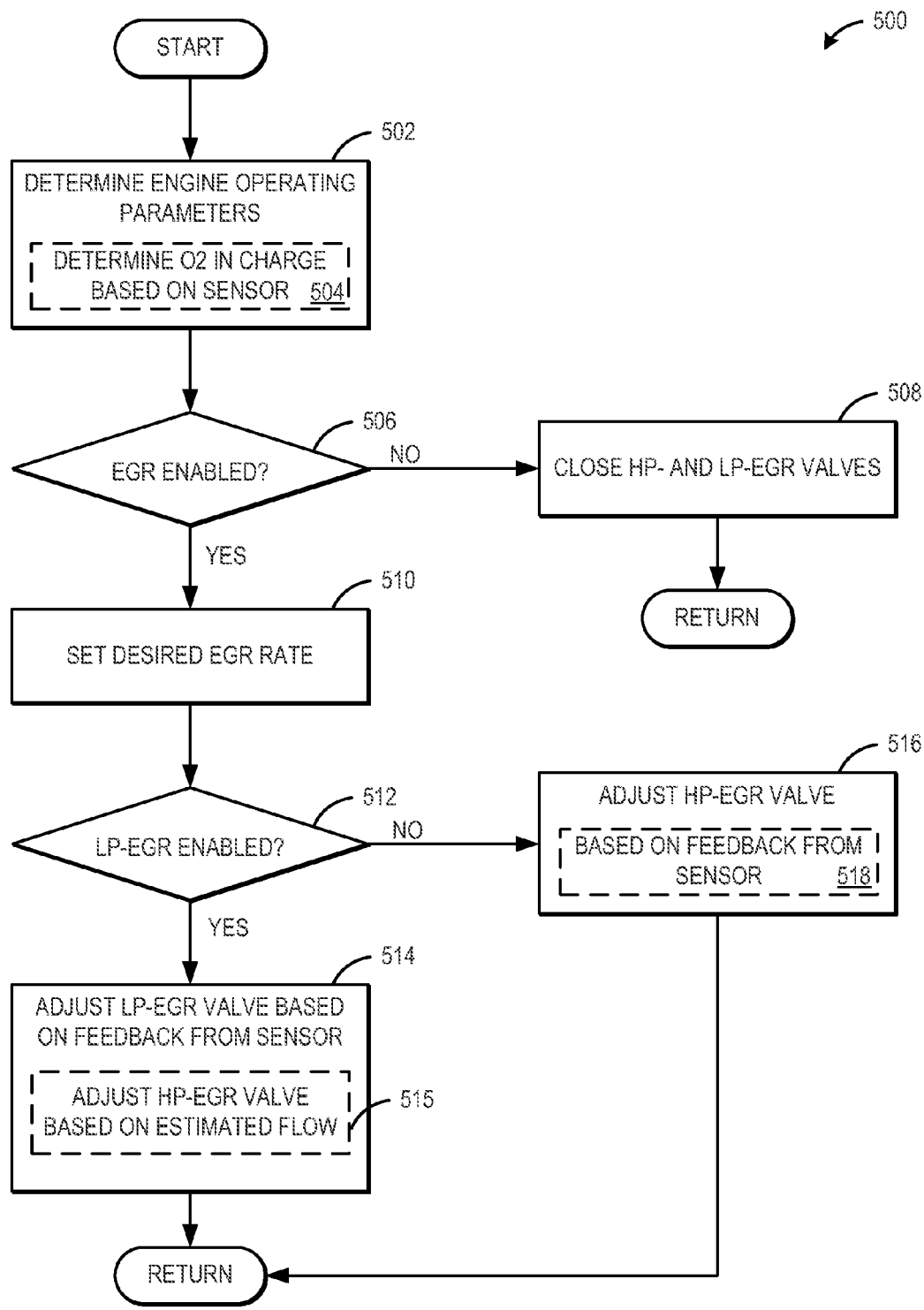
FIG. 5 is a flow chart illustrating a method for controlling a low-pressure and/or high-pressure exhaust gas recirculation system according to an embodiment of the present disclosure.

FIG. 5 is a flow chart illustrating a method 500 for controlling an LP-EGR and/or HP-EGR system based on feedback from a sensor positioned in the intake of an engine. Method 500 may be carried out by the control system of a vehicle, such as controller 112, in response to signals received from various engine sensors, such as an oxygen sensor (e.g., sensor 15 of FIGS. 1, 2, and/or 3).

Method 500 comprises, at 502, determining engine operating parameters. Engine operating parameters may include engine speed, load, temperature, MAP, etc. Further, engine parameters may include the concentration of oxygen in the charge air as determined by an oxygen sensor located in the intake at 504.

At 506, it is determined if EGR is enabled. EGR may be enabled dependent on operating parameters. For example, EGR may be disabled if engine temperature is below a threshold, if engine speed and load are below a threshold (e.g., the engine is operating at idle), etc. If EGR is not enabled, method 500 proceeds to 508 to close both the LP- and HP-EGR valves. If EGR is enabled, method 500 proceeds to 510 to set a desired EGR rate based on operating parameters. The desired EGR rate may be set in a suitable manner, such as based on a table located in the memory of the controller, and may be determined based on engine speed and load. Further, depending on engine speed and load and other operating parameters, the LP-EGR system may be enabled at the desired rate, the HP-EGR system may be enabled at the desired rate, or both the LP- and HP-EGR systems may be enabled at the desired rate.

At 512, method 500 includes determining if LP-EGR is enabled. If LP-EGR is enabled, method 500 proceeds to 514 to adjust an LP-EGR valve based on feedback from the oxygen sensor. The oxygen sensor may indicate the relative fraction of charge air that is comprised of EGR, and thus the LP-EGR valve may be adjusted based on feedback from the sensor to reach the desired EGR rate. Further, in some embodiments, the sensor may be used to determine the NOx concentration in the charge air, and thus in the EGR. The LP-EGR valve may be adjusted to control the amount of NOx in the exhaust, for example the valve may be opened in order to increase the EGR rate and thus lower the NOx concentration. Further, in some examples, if the HP-EGR system is also enabled (as determined at 510 by engine operating parameters), the HP-EGR valve may be controlled based on an estimated flow through the HP-EGR system at 515. The flow may be estimated based on a determined position of the HP-EGR valve, determined position of the LP-EGR valve, determined pressure upstream and/or downstream of the HP-EGR valve, etc.

If LP-EGR is not enabled, only HP-EGR is enabled and method 500 proceeds to 516 to adjust the HP-EGR valve to deliver the desired EGR rate. In some embodiments, such as when the sensor is located downstream of the HP-EGR inlet in the intake, the HP-EGR valve may be adjusted based on feedback from the sensor at 518. However, in embodiments where the sensor is located upstream of the HP-EGR inlet (such as the embodiments illustrated in FIGS. 1 and 2), HP-EGR may not be controlled based on feedback from the sensor but may only be controlled based on the table stored in the memory of the controller and estimated flow through the HP-EGR system as described above. Upon either closing the valves or adjusting the LP-EGR and/or HP-EGR valve, method 500 returns.

Thus, the method of FIG. 5 provides for operating a supercharged internal combustion engine including both an LP-EGR and HP-EGR system. The method comprises if both the LP-EGR and HP-EGR systems are enabled, adjusting an LP-EGR valve based on an oxygen concentration in charge air detected by a sensor arranged in an intake system of the engine, and adjusting an HP-EGR valve based on estimated HP-EGR flow. If only the LP-EGR system is enabled, only the LP-EGR valve may be adjusted, based on the oxygen concentration detected by the sensor. If only the HP-EGR system is enabled, only the HP-EGR valve may be adjusted, based on the oxygen concentration detected by the sensor.

In this way, if only the HP-EGR or LP-EGR system is enabled, closed loop control of the enabled system may be improved by an oxygen sensor in the intake, which may provide a more accurate determination of the EGR rate than an oxygen sensor in the exhaust, or than other mechanisms of estimating the EGR flow. The oxygen sensor may be positioned in the intake downstream of the compressor to increase accuracy of the sensor readings. In embodiments where the HP-EGR valve is controlled based on feedback from the intake oxygen sensor, the sensor may be positioned downstream of where the HP-EGR enters the intake.

If both the HP-EGR and LP-EGR systems are enabled, the LP-EGR valve may be controlled based on feedback from the sensor while the HP-EGR system may be controlled based on estimated EGR flow. Feedback control of the LP-EGR system may provide an accurate LP-EGR rate, and the HP-EGR valve may be controlled based on estimated EGR flow, which may include a determined position of the LP-EGR valve. In this way, the HP-EGR system may be indirectly controlled via feedback from the oxygen sensor.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating an engine with a turbocharger having a compressor and high-pressure and low-pressure exhaust as recirculation, comprising:
adjusting a low-pressure recirculation rate in a low-pressure exhaust gas recirculation line via a shut-off element in the recirculation line based on a concentration $C_{i,intake}$ of a component i in charge air detected by a sensor arranged between the compressor and a downstream charge-air cooler, the concentration determining a NOx concentration in exhaust gas.

2. The method as claimed in claim 1, wherein the concentration $C_{i,intake}$ is used to determine a proportion $F_{intake}$ of a charge air fraction resulting from combustion, and wherein the proportion $F_{intake}$ is used to determine a nitrogen oxide concentration $C_{NOx,exhaust}$ in the exhaust gas.

3. A method for operating a supercharged internal combustion engine including both an LP-EGR and HP-EGR system, comprising:
adjusting an LP-EGR valve based on an oxygen concentration in charge air detected by an intake system sensor upstream of a charge-air cooler and downstream of a compressor, and adjusting an HP-EGR valve based on estimated HP-EGR flow when both the LP-EGR and HP-EGR systems are enabled.

4. The method of claim 3, further comprising, if only the LP-EGR system is enabled, adjusting only the LP-EGR valve based on the oxygen concentration detected by the sensor.

5. The method of claim 3, further comprising, if only the HP-EGR system is enabled, adjusting only the HP-EGR valve based on the oxygen concentration detected by the sensor.

6. A supercharged internal combustion engine, comprising:
a cylinder;
an intake line in an intake system for supplying charge air to the cylinder;
an exhaust line for discharging exhaust gases;
an exhaust-gas turbocharger including a turbine arranged in the exhaust line and a compressor arranged in the intake line;
an exhaust-gas recirculation arrangement including a recirculation line which branches off from the exhaust line downstream of the turbine and opens into the intake line upstream of the compressor; and
a sensor for detecting a concentration $C_{i,intake}$ of a component i of the charge air in the intake system provided downstream of an opening of the recirculation line into the intake line, wherein a charge-air cooler is provided in the intake line downstream of the compressor, wherein the cylinder has at least one inlet opening, and wherein in an installed position of the internal combustion engine, the charge-air cooler is arranged above the at least one inlet opening of the cylinder, wherein a geodetic height in the intake system decreases continuously in a flow direction proceeding from an inlet of the charge-air cooler into the charge-air cooler toward the at least one inlet opening of the cylinder, wherein the sensor is arranged between the compressor and the charge-air cooler.

7. The supercharged internal combustion engine as claimed in claim 6, wherein a shut-off element for adjusting a recirculation rate is arranged in the recirculation line.

8. The supercharged internal combustion engine as claimed in claim 6, wherein the sensor is arranged downstream of the compressor in the intake system.

9. The supercharged internal combustion engine as claimed in claim 6, further comprising an additional exhaust-gas recirculation arrangement comprising a line which branches off from the exhaust line upstream of the turbine and opens into the intake system downstream of the compressor.

10. The supercharged internal combustion engine as claimed in claim 9, in which the charge-air cooler is provided in the intake line downstream of the compressor, and wherein the intake line opens into the intake system downstream of the charge-air cooler.

11. The supercharged internal combustion engine as claimed in claim 10, wherein the sensor is arranged downstream of an opening of the intake line into the intake system.

12. The supercharged internal combustion engine as claimed in claim 6, wherein the sensor is an $O_2$ sensor and wherein the component i is oxygen ($O_2$) in the charge air.

\* \* \* \* \*